(12) United States Patent
Zangerl et al.

(10) Patent No.: US 10,222,628 B2
(45) Date of Patent: Mar. 5, 2019

(54) DEVICE FOR DISPLAYING A TARGET MARK

(71) Applicant: Swarovski-Optik KG., Absam (AT)

(72) Inventors: Alois Zangerl, Schwaz (AT); Johannes Obleitner, Absam (AT)

(73) Assignee: Swarovski-Optik KG. (AT)

( * ) Notice: Subject to any disclaimer, the term of this patent is extended or adjusted under 35 U.S.C. 154(b) by 83 days.

(21) Appl. No.: 15/445,454

(22) Filed: Feb. 28, 2017

(65) Prior Publication Data

US 2017/0248798 A1 Aug. 31, 2017

(30) Foreign Application Priority Data

Feb. 29, 2016 (AU) .............................. A 50154/2016

(51) Int. Cl.
| | |
|---|---|
| *F41G 1/00* | (2006.01) |
| *G02B 27/34* | (2006.01) |
| *F41G 1/34* | (2006.01) |
| *G02B 5/136* | (2006.01) |
| *G02B 5/12* | (2006.01) |
| *G02B 23/10* | (2006.01) |

(52) U.S. Cl.
CPC ............. *G02B 27/34* (2013.01); *F41G 1/345* (2013.01); *G02B 5/12* (2013.01); *G02B 5/136* (2013.01); *G02B 23/105* (2013.01)

(58) Field of Classification Search
CPC .......... G02B 27/32; G02B 27/34; G02B 5/12
USPC .................................................. 33/297, 298
See application file for complete search history.

(56) References Cited

U.S. PATENT DOCUMENTS

| | | | | |
|---|---|---|---|---|
| 3,119,894 A | * | 1/1964 | Nagel ..................... | G02B 3/08 340/815.76 |
| 3,281,618 A | | 10/1966 | Swedlund | |
| 4,082,466 A | * | 4/1978 | Underberg ............... | G01C 5/02 33/291 |
| 4,214,371 A | * | 7/1980 | Bush ........................ | F41G 1/38 42/123 |
| 4,285,137 A | * | 8/1981 | Jennie ..................... | F41G 1/473 33/298 |
| 4,743,765 A | | 5/1988 | Ekstrand | |
| 5,054,917 A | | 10/1991 | Pepin et al. | |
| 5,065,520 A | | 11/1991 | Shimizu et al. | |
| 5,764,413 A | | 6/1998 | Smith et al. | |
| 6,802,131 B1 | * | 10/2004 | Scholz ................... | G01C 15/06 33/265 |
| 7,804,643 B2 | | 9/2010 | Menges et al. | |

(Continued)

FOREIGN PATENT DOCUMENTS

| | | |
|---|---|---|
| AT | 33463 B | 6/1908 |
| DE | 29903989 | 6/1999 |

(Continued)

*Primary Examiner* — G. Bradley Bennett
(74) *Attorney, Agent, or Firm* — Lerner, David, Littenberg, Krumholz & Mentlik, LLP (57) ABSTRACT

The invention relates to an optical device for displaying a reticle or a target mark in a measuring or sighting telescope, comprising a reticle plate with a reticle disposed on one surface, a light source for illuminating this reticle, and the reticle plate has an entry surface for a beam path disposed to the side of the surface provided with the reticle, and at least one retroreflector is disposed on at least one light exit surface of the reticle plate, and a reflective layer of the retroreflector is directed towards the reticle plate.

19 Claims, 7 Drawing Sheets

(56) References Cited

U.S. PATENT DOCUMENTS

| | | | | |
|---|---|---|---|---|
| 7,832,137 B2* | 11/2010 | Sammut | ................. | F41G 1/473 |
| | | | | 235/404 |
| 2002/0080480 A1 | 6/2002 | Stingl | | |
| 2009/0235570 A1* | 9/2009 | Sammut | ................. | F41G 1/473 |
| | | | | 42/122 |
| 2013/0114142 A1* | 5/2013 | Free | ....................... | B32B 27/08 |
| | | | | 359/530 |
| 2014/0059914 A1* | 3/2014 | Sammut | ................... | F41G 1/38 |
| | | | | 42/122 |
| 2014/0090259 A1* | 4/2014 | Stockdill | .................. | F41G 1/44 |
| | | | | 33/298 |
| 2018/0202767 A1* | 7/2018 | Holler | ....................... | F41G 1/38 |
| 2018/0203163 A1* | 7/2018 | Thakkar | .................. | G02B 5/12 |

FOREIGN PATENT DOCUMENTS

| | | |
|---|---|---|
| DE | 10051448 A1 | 5/2002 |
| EP | 0179036 A2 | 4/1986 |
| EP | 0718585 A1 | 6/1996 |
| EP | 0886163 | 12/1998 |
| EP | 1653271 B1 | 8/2008 |
| WO | 2011113547 A1 | 9/2011 |

\* cited by examiner

DEVICE FOR DISPLAYING A TARGET MARK

BACKGROUND OF THE INVENTION

The invention relates to an optical device for displaying a reticle or a target mark in a measuring or sighting telescope, comprising a reticle plate with a reticle disposed on one surface, a light source for illuminating this reticle, and the reticle plate has an entry surface for a beam path disposed to the side of the surface provided with the reticle.

BRIEF SUMMARY OF THE INVENTION

Reticle plates are provided in the observation beam path of optical observation and sighting devices, in particular sighting telescopes. The visible target marking applied to the substrate is referred to as a reticle. When hunting at dusk or dawn, it is often not possible to see the reticle against the dark body of the quarry. Various solutions have therefore been proposed as a means of illuminating the reticle. For example, one known approach is to etch the reticle into the substrate provided in the form of a glass plate and fill it with pigments. When illuminated by a light source, it stands out brightly against the background due to light scattering and light diffraction by the filler material. However, in the case of this known reticle plate, only a very small proportion of the light is deflected in the direction of the observer. According to EP 0 886 163 B1, a diffraction grating is therefore used as a reticle and is applied to the substrate. This makes use of the fact that in accordance with the theory of diffraction, the first diffraction order has a particularly high light intensity. Although this slightly improves the brightness of the illuminated reticle, the light is not radiated uniformly, i.e. the brightness depends on the viewing direction. Furthermore, only a very small proportion of the light power produced is deflected in the viewing direction.

Another approach known from DE 10 051 448 A1 is to frame the substrate with a light guide which is illuminated by the light source. Since the light is scattered in too large a solid angle, the energy consumption needed to obtain sufficient brightness is considerable. Based on DE 29 903 989 U1, a reticle, namely a target marking at a center of the reticle plate, is projected into another reticle applied to the substrate in the form of a cross hair by means of a projection device disposed to the side of the reticle plate via a beam splitter in the observation beam path on the substrate. Although this produces a bright reticle, the space requirement and weight involved are considerable. In addition, light transmission through the splitter layer between the two prisms of the beam splitter is reduced. It is also difficult to adjust the two reticles relative to one another. EP 0 718 585 B1 discloses a reticle having an illuminated ring with bars as a target marking, which are provided so as to form illuminated dots with a reflection surface at the tip.

A device of the type outlined above is known from EP 1 653 271 A1. To enable illumination of a large surface area of reticles that are not based on a dot-type structure, for example ring-shaped reticles, it may be necessary to use illumination covering a larger surface area. If such illumination is provided in the form of an LED with a diffuser, for example, based on this known solution, the luminance obtained in the region of the reticle is lower.

Accordingly, the objective of the invention is to improve the illumination of reticles so that good visibility and high luminance are guaranteed in the region of the reticle, even in the case of reticles based on a format other than a dot-shaped structure.

This objective is achieved by the invention on the basis of a device of the type outlined above in which at least one retroreflector is disposed on the reticle plate, and a reflective layer of the retroreflector is directed towards the reticle plate.

The solution proposed by the invention enables light exiting the reticle plate to be coupled back into the reticle plate and reflected in the direction of the reticle so that luminance in the region of the reticle is increased. In addition, light in the region of the reticle which is not coupled out in the direction of the observer is directed back onto the reticle by retroreflection, thereby resulting in increased luminance in the region of the reticle. This advantage is naturally also obtained in the case of a target mark based on a dot format. Generally speaking, the solution proposed by the invention enables the energy needed to illuminate the reticle or target mark to be significantly reduced. At this stage, it should be pointed out that the expressions target mark and reticle are used synonymously in this document.

Light can be back-coupled particularly effectively and the light deflected in the direction of the reticle due to the fact that the at least one retroreflector is disposed at least on a first side of a plane extending through the reticle and normally with respect to the surface of the reticle plate provided with the reticle, whereas the entry surface for the beam path is disposed on a second side of the plane lying opposite the first side.

Based on a preferred variant of the invention, the reticle plate has a first main surface and a second main surface, and the first and the second main surfaces extend parallel with one another and are connected to one another by a lateral surface, and a sum of surface areas of the two main surfaces is greater than a surface area of the lateral surface, and the entry surface for the beam path is formed by a portion of the lateral surface and the reticle is disposed on one of the two main surfaces.

The lateral surface of the reticle plate may have a smooth surface. The smooth surface results in an effective coupling of light and enables the retroreflector to be effectively connected to the reticle plate.

It has proved to be of particular advantage if the retroreflector is disposed on a portion of the lateral surface of the reticle plate other than the portion provided with the entry surface.

It has proved to be particularly effective in terms of increasing luminance in the region of the reticle plate if the at least one retroreflector is disposed at least on a portion of the lateral surface of the reticle plate lying diametrically opposite the entry surface for the beam path.

Furthermore, the at least one retroreflector may be disposed on at least a portion of the lateral surface of the reticle plate adjoining the entry surface.

Based on another variant of the invention, the retroreflector may be disposed on a main surface of the reticle plate lying opposite the main surface provided with the reticle.

The reticle plate is preferably of a cylindrical shape and has a base surface that is conic in section, in particular circular, or polygonal, in particular rectangular. Furthermore, the reticle plate may be made from a material that is transparent in visible light, in particular glass or plastic. The term "transparent" in the context of this document should be understood as meaning that the material used is a see-through material in the visible electromagnetic spectral range.

Furthermore, the retroreflector may be force-fit to the reticle plate by a layer that is transparent in visible light.

Based on one advantageous variant of the invention, the retroreflector may have a body, in particular an outcoupling prism, having retroreflecting structures, in particular microprisms.

It has proved to be of particular advantage if the retroreflector is provided in the form of a retroreflector foil. Using a retroreflector foil offers a very simple option in terms of manufacturing the device proposed by the invention. Furthermore, the foil can be cut in a simple manner and very exactly to the desired size and shape.

Due to the fact that a mirror for deflecting the beam path (BS) running from the light source to the reticle is provided, being disposed on the reticle plate to the side of the surface provided with the reticle, a compact design of telescopes equipped with the device proposed by the invention can be obtained.

Based on the preferred variant of the invention, the mirror has two focal points and a mirror surface of the mirror is concavely curved and the light source is disposed on a front face of the mirror in the region of a first focal point and the reticle is illuminated by the light beam directed towards a second focal point of the mirror.

Light beams directed towards the second focal point converge at the main surfaces and at the retroreflector in the region of the reticle after total reflection.

To provide a clearer understanding, the invention will be described in more detail below with reference to the appended drawings.

BRIEF DESCRIPTION OF THE DRAWINGS

These are highly simplified, schematic diagrams illustrating the following.

DETAILED DESCRIPTION

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

Figure 1:
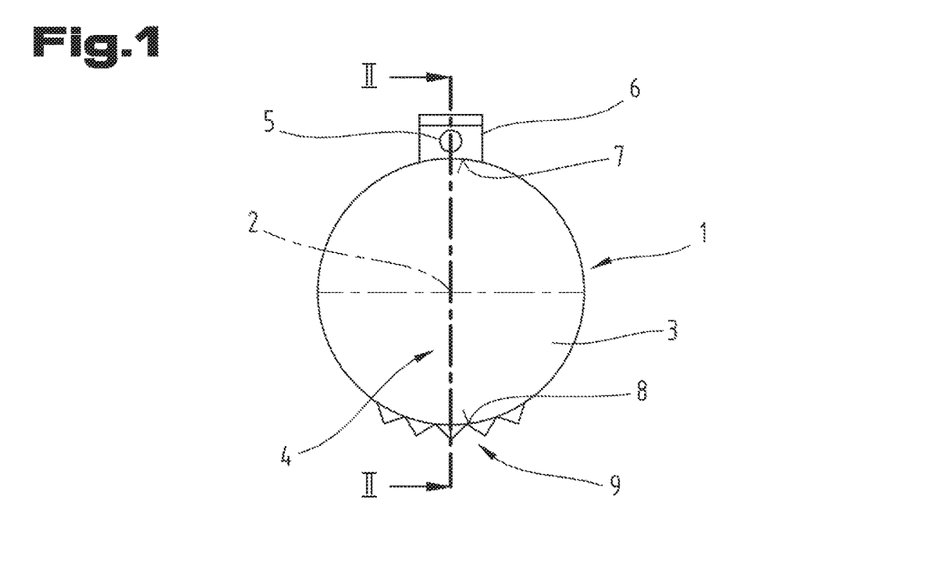
FIG. 1 is a plan view of a device for displaying a reticle.

FIG. 1 is a plan view of an optical device 1 for displaying a reticle 2. As a matter of premise, the viewing direction onto the plane of the drawing of FIG. 1 (perpendicular to the plane of the drawing) corresponds to the direction of the optical axis of the observation beam path of a telescope or sighting telescope equipped with the optical device 1.

As illustrated in FIG. 1, the optical device 1 for displaying the reticle 2 has a reticle plate 3 and a light source 5 for illuminating this reticle 2. The reticle 2 is disposed on one surface 4 of the reticle plate 3. The reticle plate 3 itself may be cylindrical in shape or may have a base surface that is conic in section, in particular circular, or polygonal, in particular rectangular. In addition, the reticle plate 3 is made from a material that is transparent in visible light, in particular glass or plastic.

The reticle 2 may be provided in the form of a diffracting and/or scattering microstructure, which is produced by etching, for example, or in the form of a diffraction grating formed on the substrate surface. In the case of an etched or engraved reticle 2, a filler material comprising pigments may be introduced into the resultant recessing so that when illuminated by the light source, the reticle 2 stands out brightly from the background due to light radiation and light diffraction on the pigments. Photoluminescent pigments which emit visible light on exposure to UV radiation may be used for this purpose, for example.

The reticle 2 may also consist of transparent gaps and light-impermeable webs disposed in an alternating arrangement. The ratio of the width of the webs to the width of the gaps is preferably greater than or equal to 1:1. The grating period of the amplitude grating will depend on the diffraction formula of the light wavelength, the angle of the incoming and outgoing light as well as the refraction index of the air and the material of the substrate.

Figure 2:
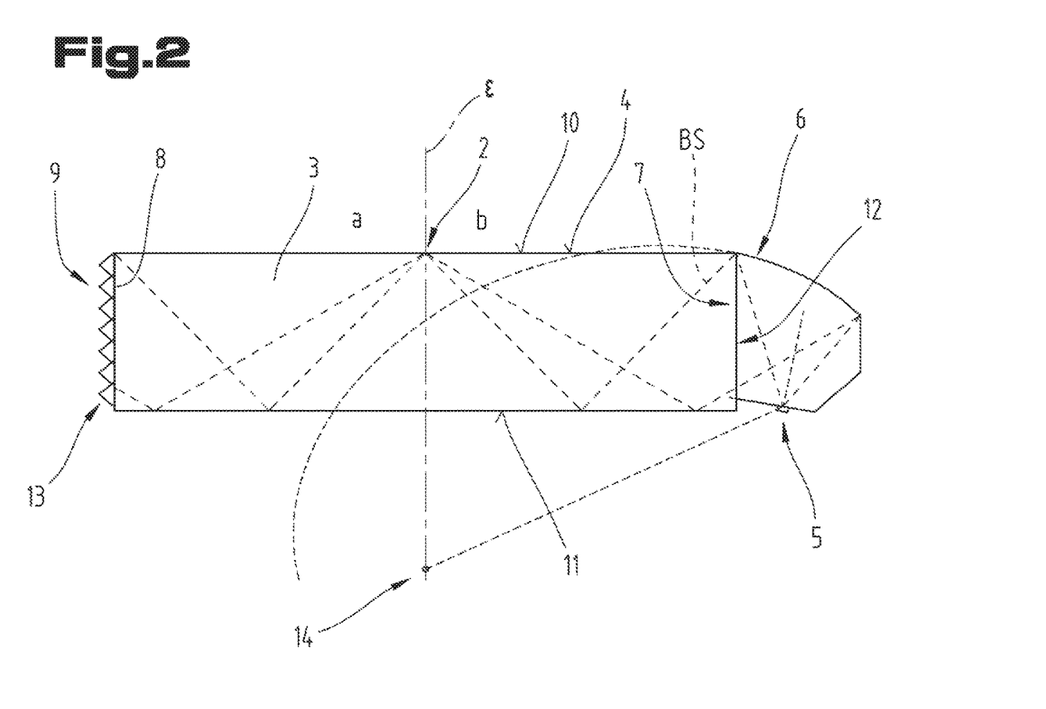
FIG. 2 is a cross-section along line II-II indicated in FIG. 1.

To the side of the surface 4 provided with the reticle 2, a mirror 6 is disposed on the reticle plate 3 for deflecting a beam path running from the light source 5 to the reticle 2, denoted by reference BS in FIG. 2. The mirror 6 may be adhered to the reticle plate 3.

As illustrated in FIG. 2, the reticle plate 3 has an entry surface 7 for the beam path BS disposed to the side of the surface provided with the reticle 2. As may be seen from FIG. 2, a retroreflector 9 is disposed on a light exit surface 8 of the reticle plate 3, as proposed by the invention. A reflective layer of the retroreflector 9 is directed towards the reticle plate 3. By retroreflector is meant a reflecting material which reflects the incident radiation back in the direction towards the radiation source largely independently of the orientation of the reflector. Many types of retroreflectors are known, for example from U.S. Pat. No. 5,764,413.

The retroreflector 9 preferably has a reflective layer with retroreflecting structures comprising microprisms or glass microspheres, and the reflective layer may be provided with a top layer having a planar surface that is transparent to visible light.

Furthermore, the retroreflector 9 is disposed on a first side a of a plane ε extending through the reticle 2 and normally to the surface ε of the reticle plate 3 provided with the reticle 2. The entry surface 7 for the beam path BS is disposed on a second side b of plane ε lying opposite side a. In addition, the retroreflector 9 may be force-fit to the reticle plate 3 by a layer that is transparent to visible light. For example, an adhesive may be used to connect the retroreflector, for example UV-cured acrylates, or epoxy resins, etc.

The retroreflector 9 may be provided in the form of a retroreflector foil, as illustrated in FIG. 2.

As may also be seen from FIG. 2, the reticle plate 3 has a first main surface 10 and a second main surface 11. The first main surface 10 and the second main surface 11 extend parallel with one another and are connected to one another by a lateral surface 12. The lateral surface 12 of the reticle plate 3 may have a smooth surface.

A sum of the surface areas of the two main surfaces 10, 11 may be greater than a surface area of the lateral surface 12. The entry surface 7 for the beam path BS is formed by a portion of the lateral surface 12. The retroreflector 9 is disposed on a different portion of the lateral surface 12 of the reticle plate 3 from the portion provided with the entry surface 7. In the embodiment illustrated, the retroreflector 9 is disposed on a portion 13 of the lateral surface 12 of the reticle plate lying diametrically opposite the entry surface 7 for the beam path BS. However, it is not absolutely necessary to use this layout and the retroreflector 9 may generally be disposed on a portion of the lateral surface 12 adjoining the entry surface 7 at which light generated by the light source 5 exits the reticle plate 3, in which case the retroreflector 9 may also occupy the entire lateral surface 12 with the exception of the entry surface 7.

In the embodiments illustrated in FIGS. 2-5, the reticle 2 is disposed on the main surface 10.

The mirror 6 has two focal points and a mirror surface of the mirror 6 is concavely curved. The light source 5 is disposed on a front face of the mirror 6 in the region of a first focal point of the mirror 6. The light beams directed to a second focal point 14 of the mirror 6 constituting the beam path BS illuminate the reticle 2.

In order to highlight the geometric relationships between the light source 5, the mirror 6 and the aforementioned second focal point 14, an ellipsis enveloping the curved mirror surface of the mirror 6 is indicated by an arc in broken lines in FIGS. 2 to 5. The two focal points of this ellipsis coincide with the light source 5 on the one hand and with said second focal point 14 of the mirror 6 on the other hand.

The light beams directed onto the second focal point 14 after being reflected on the mirror surface of the mirror 6 converge on the main surface 11 in the region of the reticle 2 disposed on the other main surface 10 after total reflection. Some of the light arriving at the reticle 2 passes out from the reticle plate 3 and is radiated from the reticle 2 into the observation beam path of the telescope. This is due to the interaction with the pigments or diffraction grating constituting the reticle 2. That part of the light which remains in the reticle plate 3 due to total reflection on the main surface 10 is reflected in succession on the main surface 11, on the retroreflector 9 and again on the main surface 11 and then likewise converges in the region of the reticle 2 where it is available to illuminate the latter. Accordingly, luminance in the region of the reticle 2 is significantly increased.

By focusing the light on the reticle 2, a reticle with a high luminance is obtained. To obtain a uniform distribution of brightness across the viewing angle, the light leaving the reticle 2 preferably has the same opening angle as the downstream observation optics, namely the eyepiece. This is due to the mirror 6 and its design in conjunction with the diffraction grating.

The reticle 2 preferably radiates the light of the laterally disposed light source perpendicular to the main surface 11 of the reticle plate 3. With a diffraction grating, however, angles other than 90 degrees are also possible. Also to be taken into account is the fact that the beams exit at a specific opening angle.

Figure 3:
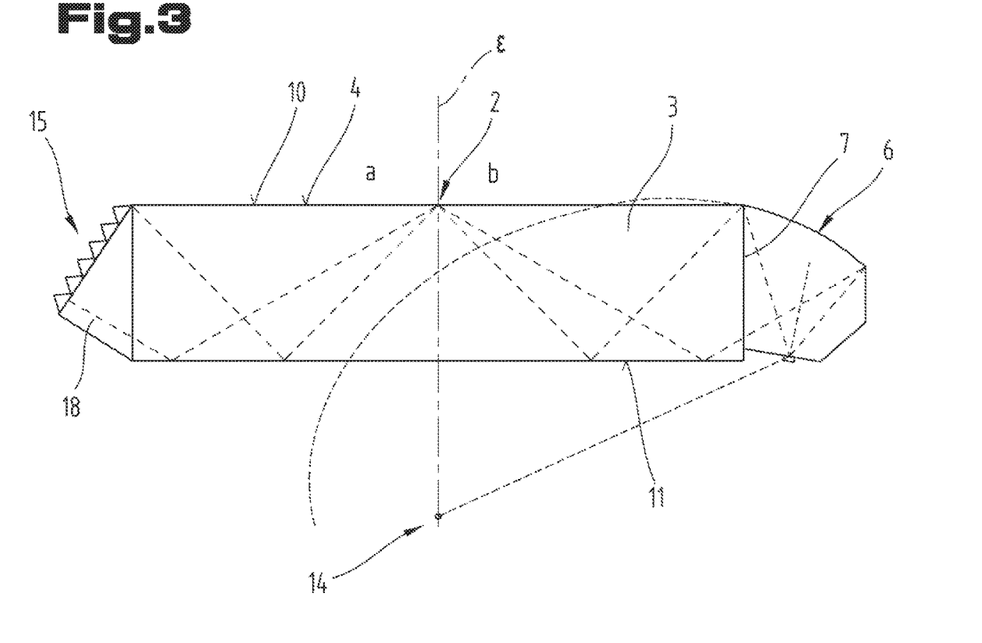
FIG. 3 is a cross-section through a second variant of a reticle plate proposed by the invention.
Figure 5:
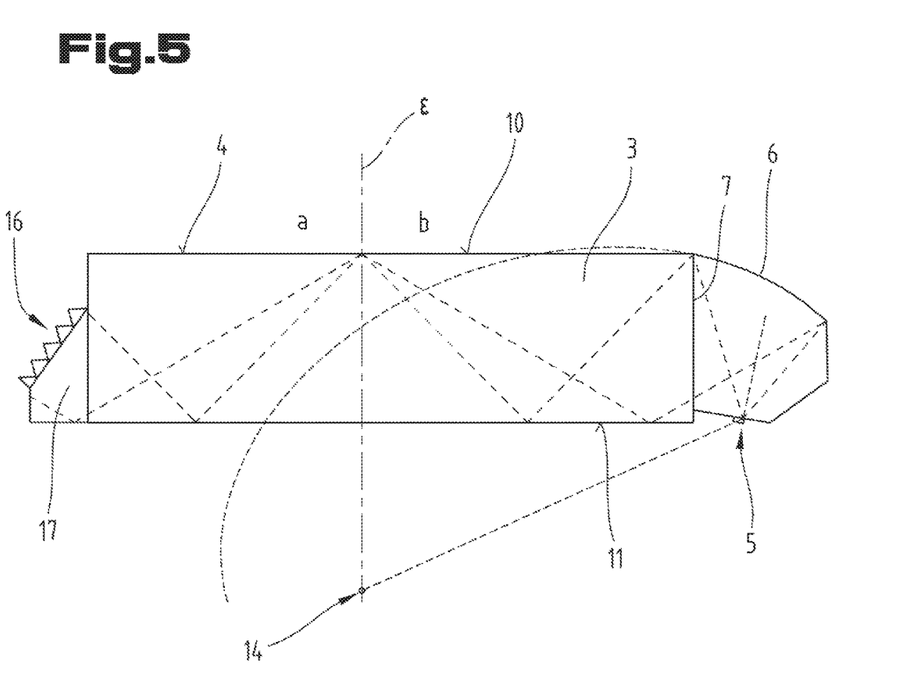
FIG. 5 is a cross-section through a fourth variant of a reticle plate proposed by the invention.

As illustrated in FIG. 3 and FIG. 5, the retroreflector 15, 16 may also have a body 17, 18 which may be in the form of an outcoupling prism for coupling light out of the reticle plate. The body 17, 18 may be made from glass or plastic, for example. A retroreflector foil may be glued to the body 17, 18. As an alternative to gluing on a retroreflector foil, however, a reflective layer comprising retroreflecting structures may also be directly incorporated or formed in the body 17, 18. In the examples illustrated in FIG. 3 and FIG. 5, the reflective layer of the retroreflector 15, 16 illustrated is inclined relative to the main surfaces 10, 11 of the reticle plate 3 in each case. The reflective layers of the retroreflector 15, 16 are preferably disposed in a vertical position relative to the main direction of propagation of the incident light hitting them. The effect of the retroreflection can be optimized as a result.

Figure 4:
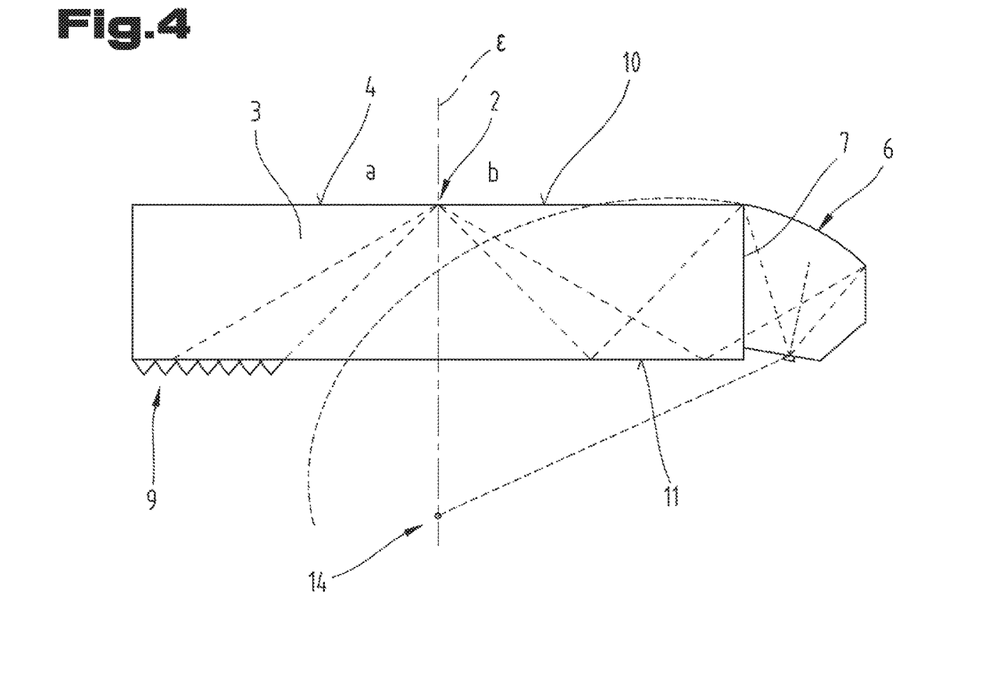
FIG. 4 is a cross-section through a third variant of a reticle plate proposed by the invention.

In the example illustrated in FIG. 4, the retroreflector 9 is disposed on the main surface 11 lying opposite the main surface 10 provided with the reticle 2.

Figure 6:
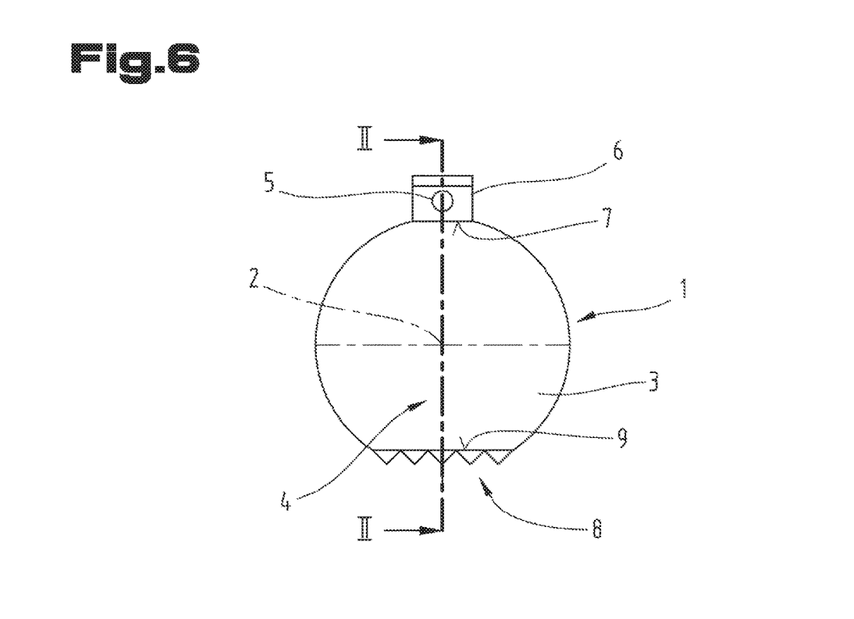
FIG. 6 is a plan view of a reticle plate based on a fifth variant.

FIG. 6 illustrates an example of an alternative embodiment of the device 1. In this instance, the entry surface 7 for the beam path BS (FIG. 2) is of a planar design in that the reticle plate 3 or its lateral surface 12 is flattened in the region of the mirror 6. This can be achieved, for example, by grinding the glass body constituting the reticle plate 3 to obtain a planar surface. In this manner, the prism body and/or the mirror 6 can be more easily connected to the reticle plate 3. This connection is obtained by the standard method used for glass bodies known as cementing. Alternatively, as illustrated in FIG. 6, the light exit surface 8 on the lateral surface 12 of the reticle plate 3 may also be of a planar design. If the retroreflector 9 is provided in the form of a retroreflector foil, this will therefore provide a flat connection point or adhesion surface.

Figure 7:
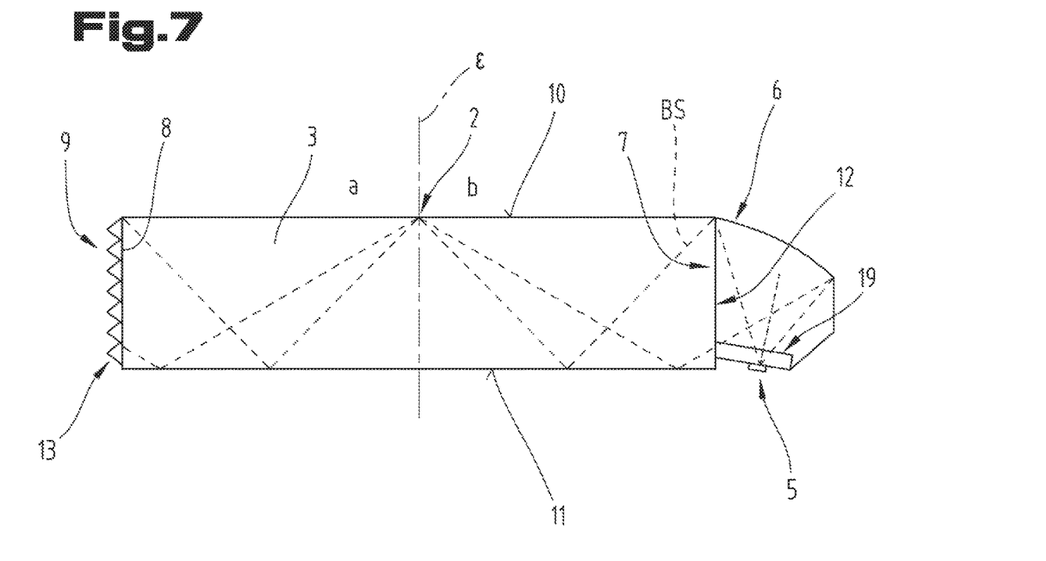
FIG. 7 is a cross-section of a reticle plate based on a sixth variant.

FIG. 7 illustrates an example of another embodiment of the device 1, viewed in section. In this instance, a diffuser plate 19 or diffusor is disposed in the beam path BS between the light source 5 and the reflecting surface of the mirror 6. As a result, the illuminated surface area on the main surface 10 in the region of the reticle 2 is made wider or larger. This means that it is now possible to obtain uniform lighting if using a more complex reticle or a reticle with a larger surface area as a target mark instead of just a single, centrally disposed dot. In addition, the luminance of the reticle 2 is significantly increased due to the retroreflector 9 disposed diametrically opposite the entry surface 7 of the beam path BS.

Using the reticle plate 3 proposed by the invention with a retroreflector 9, 15, 16 disposed on it has the effect in each of the embodiments described as examples of illuminating the reticle 2 more uniformly, as a result of which it can be displayed to the observer with a largely uniform brightness in all its parts.

Figure 8:
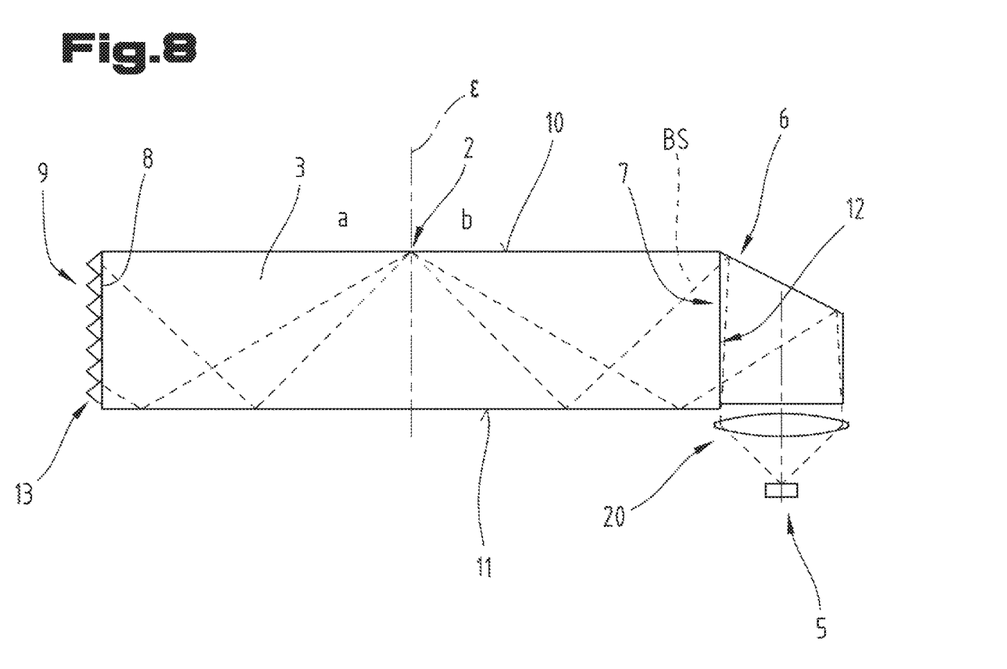
FIG. 8 is a cross-section of a reticle plate based on a seventh variant.

FIG. 8 illustrates a cross-section of a device 1 based on another embodiment. In the case of this device 1, the mirror 6 has a planar mirror or reflection surface for deflecting the light of the light source 5 into the reticle plate 3 through the entry surface 7. In order to create a convergent beam path to the reticle 2, a lens 20 is disposed between the light source 5 and the mirror 6. The retroreflector 9 disposed on the light exit surface 8 or oppositely lying side of the lateral surface 12 again ensures that in the region of the reticle 2 in the interior of the reticle plate 3, totally reflected light is directed back to the main surface 10 provided with the reticle 2.

Figure 9:
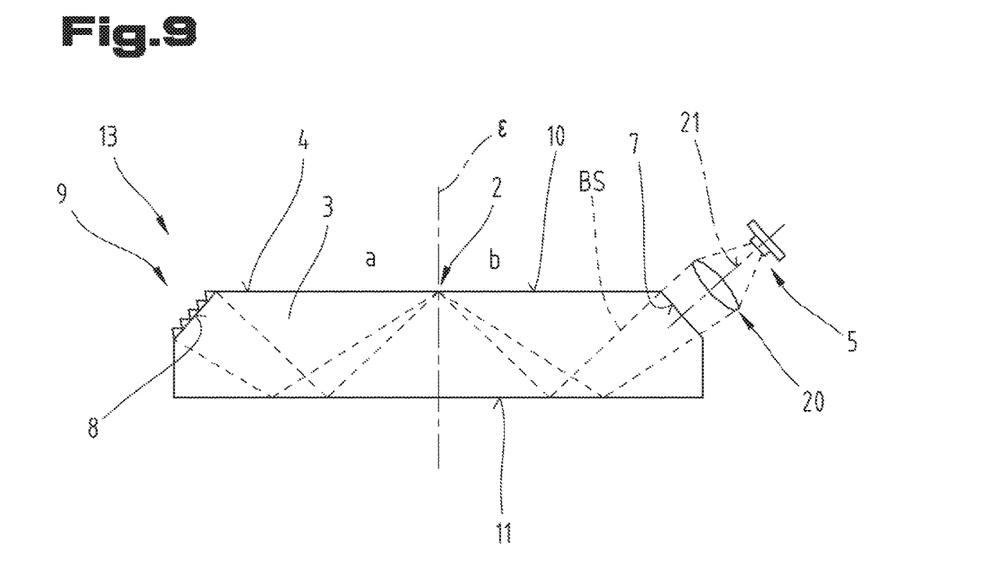
FIG. 9 is a cross-section of a reticle plate based on an eighth variant.

An example of another alternative embodiment of the device 1 for displaying the reticle 2 of a target mark is illustrated in FIG. 9. In this instance, having been bundled by the lens 20, the light of the light source 5 hits the main surface 11 at an angle, where a first total reflection takes place. In order to achieve an incident beam path angled in this manner, the light source 5 and the lens 20 are likewise disposed at an angle and to the side of the reticle plate 3. An optical axis 21 of the beam path BS in the region of the light source 5 and lens 20 is oriented in alignment with the main direction of propagation of the light onto the main surface 11. To this end, the entry surface 7 for the beam path BS is formed by a planar surface produced by grinding on the glass body constituting the reticle plate 3. The entry surface 7 is also oriented perpendicular to the optical axis 21 of the light source 5 and/or lens 20. The light exit surface 8 on the reticle plate 3 lying opposite the entry surface 7 can produced in the same manner.

Alternatively, the entry surface 7 and the light exit surface 8 may also be provided as separate bodies, as was the case with the bodies 17, 18 described in connection with the embodiments described as examples with reference to FIGS. 3 and 5.

Figure 10:
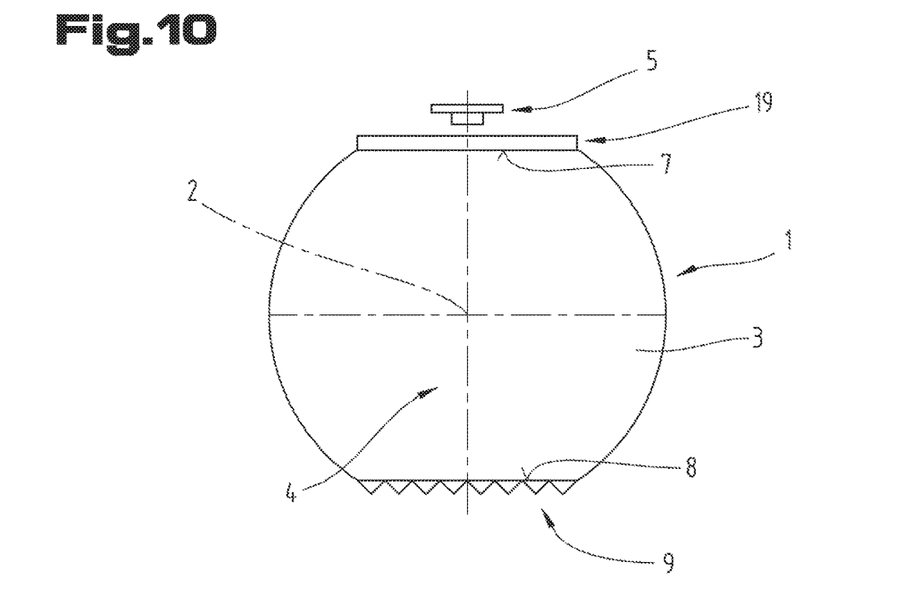
FIG. 10 is a plan view of a reticle plate based on a ninth variant.

FIG. 10 is a plan view illustrating the device 1 for displaying the reticle 2 of a target mark in a telescope based on another example of an embodiment. The entry surface 7 of the beam path BS in this instance is disposed flat on the reticle plate 3 and a diffuser plate 19 for creating a diffuse beam path of the light from the light source 5 is disposed on or affixed to the entry surface 7. This entry surface 7 may be a flat or planar point on the glass body of the reticle plate 3 produced by grinding. The entry surface 7 is also oriented parallel with the optical axis of the observation beam path (i.e. perpendicular to the plane of the drawing in FIG. 10). The luminance in the region of the reticle 2 on the surface 4 of the reticle plate 3 can be increased due to the retroreflector 9 disposed opposite the entry surface 7.

Figure 11:
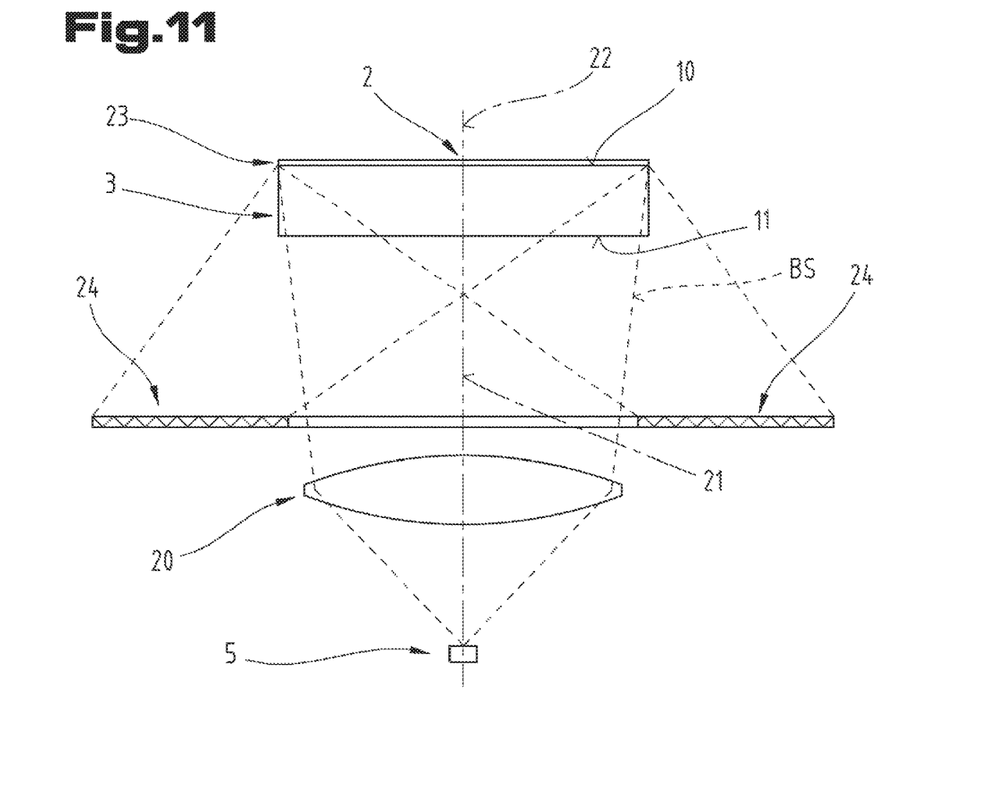
FIG. 11 is a cross-section of a device for displaying a reticle created by a mask.

FIG. 11 illustrates an alternative device for displaying a reticle 2 in longitudinal section with respect to the optical axis 21 of the beam path BS. Based on this variant for displaying a reticle of a target mark, the image of the reticle 2 is coupled into the observation beam path of the telescope with the aid of projection optics (not illustrated) having an optical axis 22 and after deflection by a coupling prism. The reticle plate 3 is therefore disposed outside the observation beam path of the telescope. The reticle 2 is created by applying a mask 23 to the reticle plate 3. To this end, the mask 23 physically contains a negative of the reticle 2, and points forming elements of the reticle 2 are previous to light whereas other regions of the mask 23 are impervious to light. The mask 23 is made by selective vapor deposition of metal on the glass body constituting the reticle plate 3, for example. This reticle plate 3 with the mask 23 is illuminated by means of the light source 5 and a condenser lens 20. Based on this embodiment, the device 1 has a retroreflector 24 that is ring-shaped and disposed symmetrically with respect to the optical axis 21 of the beam path BS, preferably in the region of the condenser lens 20. Providing this retroreflector 24 enables the radiation density in the region of the reticle 2 or mask 23 to be increased and hence also the light yield.

Figure 12:
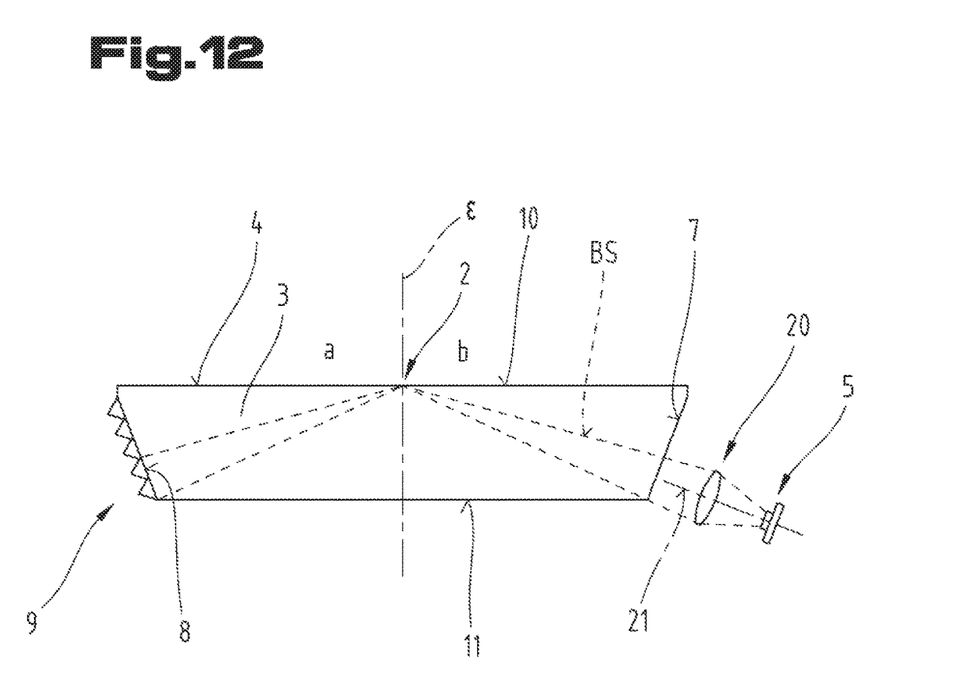
FIG. 12 is a cross-section of a reticle plate based on a tenth variant.

FIG. 12, finally, illustrates a variant of the embodiment of the device 1 illustrated in FIG. 9. In this instance, the disposition of the entry surface 7 on the reticle plate 3 on the one hand and that of the light source 5 with the lens 20 on the other hand is such that the main direction of propagation of the light coming from the light source 5 is oriented directly onto the first main surface 10 respectively directly towards the reticle 2. The optical axis 21 of the illumination system comprising the light source 5 and lens 20 in this instance is oriented directly towards the reticle 2. Based on this embodiment of the entry surface 7 on the reticle plate 3, the light exit surface 8 is disposed diametrically opposite the entry surface 7 for the beam path BS. Accordingly, the light exit surface 8 is preferably oriented perpendicular to the direction in which the light is reflected by the first main surface 10.

It goes without saying that the embodiments illustrated in the drawings may be combined with one another and retroreflectors can be disposed at several points of the reticle plate 3.

For the sake of good order, it should be pointed out that in order to provide a clearer understanding of the structure, some elements are illustrated to a certain extent out of scale and/or on a larger scale and/or on a smaller scale.

The invention claimed is:

1. A optical device for displaying a reticle or a target mark in a measuring or sighting telescope, comprising
    a reticle plate including a reticle disposed thereon,
    a light source arranged to illuminate the reticle,
    the reticle plate having an entry surface disposed to a side of the reticle plate for a beam path running from the light source to the reticle, and
    at least one retroreflector disposed on the reticle plate, the retroreflector including a reflective layer directed toward the reticle plate.

2. The device according to claim 1, wherein the at least one retroreflector is disposed on a first side of a plane extending through the reticle and normally with respect to the reticle plate, whereas the entry surface for the beam path is disposed on a second side of the plane opposite the first side.

3. The device according to claim 1, wherein the reticle plate has a first main surface and a second main surface, and the first main surface and the second main surface extend parallel with one another and are connected to one another by a lateral surface, and a sum of surface areas of the two main surfaces is greater than a surface area of the lateral surface, and the entry surface for the beam path is formed by a portion of the lateral surface and the reticle is disposed on one of the two main surfaces.

4. The device according to claim 3, wherein the lateral surface of the reticle plate has a smooth surface.

5. The device according to claim 3, wherein the retroreflector is disposed on a portion of the lateral surface of the reticle plate.

6. The device according to claim 5, wherein the at least one retroreflector is disposed at least on a portion of the lateral surface of the reticle plate lying diametrically opposite the entry surface for the beam path.

7. The device according to claim 5, wherein the at least one retroreflector is disposed on at least a portion of the lateral surface of the reticle plate adjoining the entry surface.

8. The device according to claim 1, wherein the at least one retroreflector is disposed on a first main surface of the reticle plate lying opposite a second main surface provided with the reticle.

9. The device according to claim 1, wherein the reticle plate is cylindrical and has a base surface that is conical in section.

10. The device according to claim 1, wherein the reticle plate is made from a material that is transparent to visible light.

11. The device according to claim 1, wherein the retroreflector is force-fit to the reticle plate by a layer that is transparent in visible light.

12. The device according to claim 1, wherein the retroreflector has a body including retroreflecting structures.

13. The device according to claim 1, wherein the retroreflector comprises a retroreflector foil.

14. The device according to claim 1, comprising a diffuser plate disposed in the beam path downstream of the light source.

15. The device according to claim 3, comprising a condenser lens disposed in the beam path downstream of the light source.

16. The device according to claim 15, wherein an optical axis of the beam path in the region of the light source and condenser lens is oriented in alignment with the main direction of propagation of the light toward the first main surface or toward the second main surface.

17. The device according to claim 1, comprising a mirror for deflecting the beam path running from the light source to the reticle.

18. The device according to claim 17, wherein the mirror has two focal points and a concave and a front surface, the light source is disposed on the front face of the mirror in the region of a first focal point of the mirror, wherein the reticle is illuminated by light beams directed toward a second focal point of the mirror.

19. The device according to claim 18, wherein after total reflection on the main surfaces and retroreflection on the retroreflector, light beams directed toward the second focal point converge in the region of the reticle.

* * * * *

UNITED STATES PATENT AND TRADEMARK OFFICE
CERTIFICATE OF CORRECTION

PATENT NO. : 10,222,628 B2
APPLICATION NO. : 15/445454
DATED : March 5, 2019
INVENTOR(S) : Alois Zangerl and Johannes Obleitner It is certified that error appears in the above-identified patent and that said Letters Patent is hereby corrected as shown below:

On the Title Page

Under (30), Foreign Application Priority Data: Feb. 29, 2016 (AU) A 50154/2016 delete "(AU)" and insert -- (AT) --.

Signed and Sealed this
Twenty-first Day of May, 2019

Andrei Iancu
*Director of the United States Patent and Trademark Office*